G. F. GRIMM.
STRAINER.
APPLICATION FILED OCT. 2, 1908.

936,997.

Patented Oct. 12, 1909.

WITNESSES
E. M. Callaghan
L. A. Stanley

INVENTOR
GEORGE F. GRIMM
BY Munn & Co.
ATTORNEYS

UNITED STATES PATENT OFFICE.

GEORGE F. GRIMM, OF EVANSVILLE, INDIANA.

STRAINER.

936,997.  Specification of Letters Patent.  Patented Oct. 12, 1909.

Application filed October 2, 1908. Serial No. 455,892.

*To all whom it may concern:*

Be it known that I, GEORGE F. GRIMM, a citizen of the United States, and a resident of Evansville, in the county of Vanderburg and State of Indiana, have made certain new and useful Improvements in Strainers, of which the following is a specification.

My invention relates to strainers and it consists in the combinations, constructions and arrangements herein described and claimed.

In the ordinary manner of preparing coffee, tea, or like beverages, considerable difficulty is often experienced in obtaining a clear liquid free from grounds. To obviate this, strainers have been employed in which the ground coffee or the tea is placed and the water, having access to the latter through the perforations, forms a decoction which is clear. Coffee or tea pots having these strainers are usually constructed in an especial way to support the strainer and often are too complicated to be of much use.

The main object of my invention is to provide a device by which a strainer may be supported on a coffee pot of ordinary construction without changing the latter in the least.

A further object of my invention is to provide an adjustable support which may be applied to pots of different size.

Other objects and advantages will appear in the following specification.

My invention is illustrated in the accompanying drawing, in which—

Figure 1:
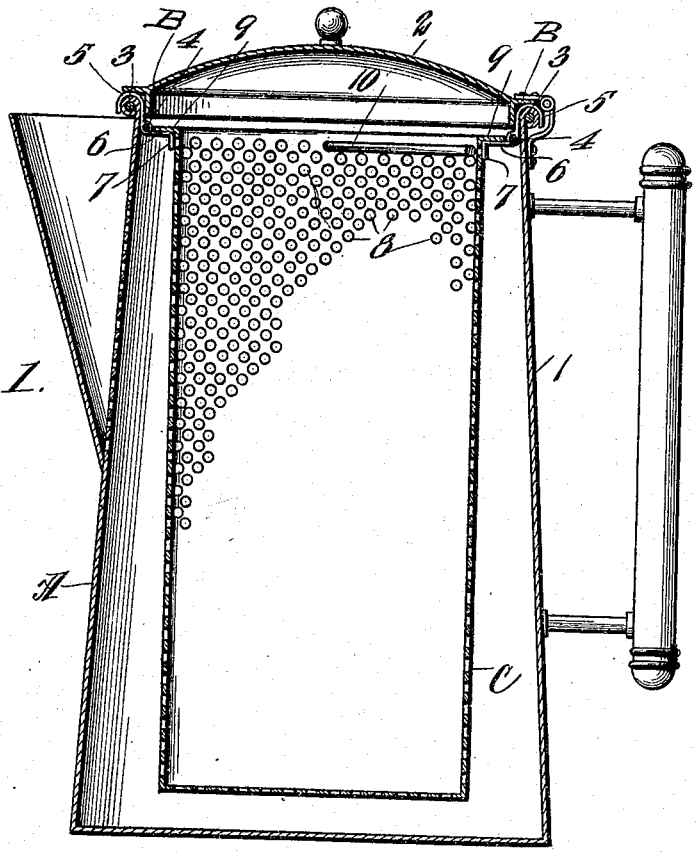
Figure 2:
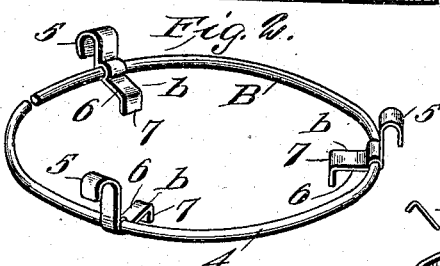
Figure 3:
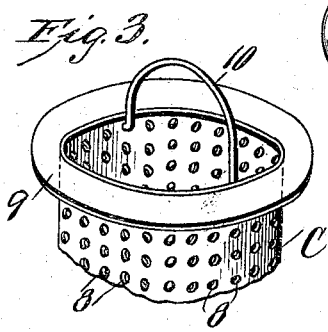

Figure 1 is a sectional view of a coffee pot embodying my invention. Fig. 2 is a view of the adjustable holder. Fig. 3 is a view of the strainer proper, the lower half being broken away, and Fig. 4 is a view showing a modified form of strainer.

Referring now to Fig. 1 I have shown therein a coffee pot A of the ordinary construction, having the main body portion 1 and the hinged top 2. Suspended from the upper edge 3 of the pot is the support B. This consists of a piece of spring wire 4 bent to form a circle but not joined at its ends. Secured to the ring 4 at approximately equal distances apart are the supporting members *b*. The latter are provided with upwardly extending hooks 5 and laterally extending flanges 6 having downwardly turned end portions 7. The strainer C may be a cylindrical cup provided with perforations 8, or it may be a gauze basket. At its upper edge the strainer is provided with an outwardly extending flange 9 and it also has a bail 10 by which it may be lifted.

From the description of the various parts the operation of my invention may be readily understood. In applying the device to an ordinary coffee pot, the ring 4, the ends of which are normally sprung apart, is compressed until it will enter the upper part of the pot when the hooks 5 are slipped over the rim 3, and the ring allowed to assume a position close to the walls of the vessel. The strainer C is then lowered through the ring, the flange 9 resting on the lateral flanges 6 of the members *b*. The downwardly extending flanges 7 act as lateral guides or centering members. The ground coffee or tea is then placed in the interior of the strainer and prepared in the ordinary manner. When the cover 2 is closed the bail 10 will be within the strainer as shown in Fig. 1. It will be observed that the ring 4 will fit pots of different sizes, thus rendering the support self adjusting.

Figure 4:
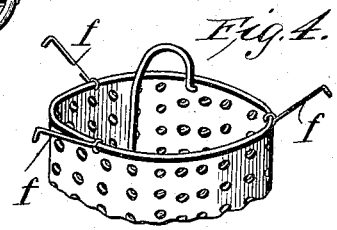

In Fig. 4 I have shown a modified form of strainer support. This consists in a number of arms *f* pivoted to the upper edge of the strainer and provided with hooked ends adapted to engage the upper rims of pots of different size.

I claim—

1. The combination with a pot, of a strainer having an outwardly extending flange at its upper edge, a spring split ring, and a plurality of attaching members secured on said ring, each of said attaching members having an outwardly turned hook portion adapted to engage the upper edge of the pot, and an inwardly extending flange portion provided with bent ends constituting lateral retaining members.

2. The combination with a pot, of a strainer having an outwardly extending flange at its upper edge, a spring split ring, and supporting members secured to said split ring, said supporting members comprising outwardly turned attaching hooks adapted to engage the upper edge of the pot and integral inwardly extending flanges adapted to engage the flange on said strainer for supporting the latter.

GEORGE F. GRIMM.

Witnesses:
CHAS. W. MCKINNEY,
EDWARD J. GRIMM.